United States Patent
Kojima (10) Patent No.: US 8,139,897 B2
(45) Date of Patent: Mar. 20, 2012

(54) DETECTING TILT IN AN IMAGE HAVING DIFFERENT RESOLUTIONS IN DIFFERENT DIRECTIONS

(75) Inventor: Keiji Kojima, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 997 days.

(21) Appl. No.: 12/073,216

(22) Filed: Mar. 3, 2008

(65) Prior Publication Data

US 2008/0226196 A1 Sep. 18, 2008

(30) Foreign Application Priority Data

Mar. 15, 2007 (JP) ................. 2007-067159
Dec. 18, 2007 (JP) ................. 2007-326356

(51) Int. Cl.
*G06K 9/32* (2006.01)
(52) U.S. Cl. ........ 382/298; 382/276; 382/289; 382/294; 382/299
(58) Field of Classification Search .................. 382/289, 382/296

See application file for complete search history.

(56) References Cited

U.S. PATENT DOCUMENTS

| | | | | |
|---|---|---|---|---|
| 4,723,297 A | * | 2/1988 | Postl ............................. | 382/289 |
| 5,093,653 A | * | 3/1992 | Ikehira .......................... | 345/657 |
| 5,276,742 A | * | 1/1994 | Dasari et al. .................. | 382/297 |
| 5,297,217 A | * | 3/1994 | Hamilton et al. ............. | 382/296 |
| 5,313,311 A | * | 5/1994 | Brandkamp ................... | 358/474 |
| 5,337,161 A | * | 8/1994 | Hube ............................. | 358/448 |
| 5,410,417 A | * | 4/1995 | Kuznicki et al. ............. | 358/426.02 |
| 5,452,374 A | * | 9/1995 | Cullen et al. .................. | 382/293 |
| 5,519,794 A | * | 5/1996 | Sandor et al. ................. | 382/285 |
| 5,528,387 A | * | 6/1996 | Kelly et al. ................... | 358/488 |
| 6,069,983 A | * | 5/2000 | Otaki ............................. | 382/296 |
| 6,970,607 B2 | * | 11/2005 | Jia et al. ........................ | 382/296 |
| 7,139,441 B2 | * | 11/2006 | Aihara .......................... | 382/298 |
| 7,630,581 B2 | | 12/2009 | Kojima et al. | |
| 2003/0044086 A1 | * | 3/2003 | Jia et al. ........................ | 382/296 |
| 2003/0152291 A1 | * | 8/2003 | Cheatle ......................... | 382/296 |
| 2004/0091172 A1 | * | 5/2004 | Aihara .......................... | 382/298 |
| 2005/0280849 A1 | * | 12/2005 | Kojima et al. ................ | 358/1.9 |

(Continued)

FOREIGN PATENT DOCUMENTS

JP 03-281469 12/1991

(Continued)

OTHER PUBLICATIONS

Goro, B. et al., "Picture Inclination Detection Method", English Translation of Patent Abstracts of Japan Publication No. 07-192086, p. 1-17.*

(Continued)

*Primary Examiner* — Jason M Repko
*Assistant Examiner* — Gandhi Thirugnanam
(74) *Attorney, Agent, or Firm* — Harness, Dickey & Pierce, P.L.C.

(57) ABSTRACT

An image processing device includes an acquiring unit that acquires, from image data, processing image data having a first resolution in a first direction and a second resolution in a second direction different from the first direction; a receiving unit that receives input of a first theoretical resolution in the first direction and a second theoretical resolution in the second direction; and a tilt detecting unit that detects tilt of the image data in accordance with the processing image data and the first theoretical resolution and the second theoretical resolution.

12 Claims, 10 Drawing Sheets

U.S. PATENT DOCUMENTS

| | | | |
|---|---|---|---|
| 2006/0044623 A1* | 3/2006 | Morimoto et al. | 358/448 |
| 2008/0137987 A1* | 6/2008 | Kojima et al. | 382/275 |
| 2008/0226196 A1* | 9/2008 | Kojima | 382/289 |

FOREIGN PATENT DOCUMENTS

| | | |
|---|---|---|
| JP | 08-320916 | 12/1996 |
| JP | 2000-040122 | 2/2000 |
| JP | 3281469 | 5/2002 |
| JP | 3338537 | 10/2002 |

OTHER PUBLICATIONS

Takashi, S., "Method for inclination of document image", English Translation of Patent Abstracts of Japan Publication No. 07-141465, p. 1-11.*

Goro, B. et al., "Picture Inclination Detection Method" (English Translation), JP 3338537.*

Abstract of JP 07-141465 published Jun. 2, 1995.

* cited by examiner

INFORMATION REGION
(CHARACTERS, DRAWING, PHOTOGRAPHS, TABLES, GRAPHS ETC.)
12

ORIGINAL DOCUMENT
11

FIG. 3B

IMAGE REGION FOR ORIGINAL DOCUMENT IMAGE
14

INPUTTED IMAGE
13

IMAGE REGION FOR OTHER THAN ORIGINAL DOCUMENT IMAGE
15

TWO PIXELS

IGNORE BECAUSE THREE PIXELS OR LESS,
AND OBTAIN AS A CONSECUTIVE REGION OF BLACK PIXELS

DETECTING TILT IN AN IMAGE HAVING DIFFERENT RESOLUTIONS IN DIFFERENT DIRECTIONS

CROSS-REFERENCE TO RELATED APPLICATIONS

The present application claims priority to and incorporates by reference the entire contents of Japanese priority documents 2007-067159 filed in Japan on Mar. 15, 2007 and 2007-326356 filed in Japan on Dec. 18, 2007.

BACKGROUND OF THE INVENTION

1. Field of the Invention

The present invention relates to an image processing device, an image processing method and a computer program product.

2. Description of the Related Art

With image processing devices, an original document is read by a reading device such as a scanner. The images read out are then subjected to various image processing and image correction. When, for example, an original document is tilted while inputting an original document from image equipment such as a copier, processing such as skew correction processing for correcting tilting of an image, and noise removal processing etc. for removing isolated point noise present within the image is carried out.

For example, Japanese Patent Application Laid-open No. H8-320916 discloses a conventional technology for detecting tilting of an original document image. Specifically, circumscribed rectangles circumscribing character and pattern blocks at corner portions of a document image are detected. A scanning line is then made to rotate centered about a point of intersection of a detected side of a circumscribed rectangle and a side of a character and pattern block. A maximum rotation angle where character and pattern elements are not detected on a scanning line (the angle where character and pattern elements are first detected) is then detected as tilting correction for an original document image that is a target of processing. The above processing is then carried out for all corner portions, and an average value is detected as the tilting of the original document image.

Figure 11A:
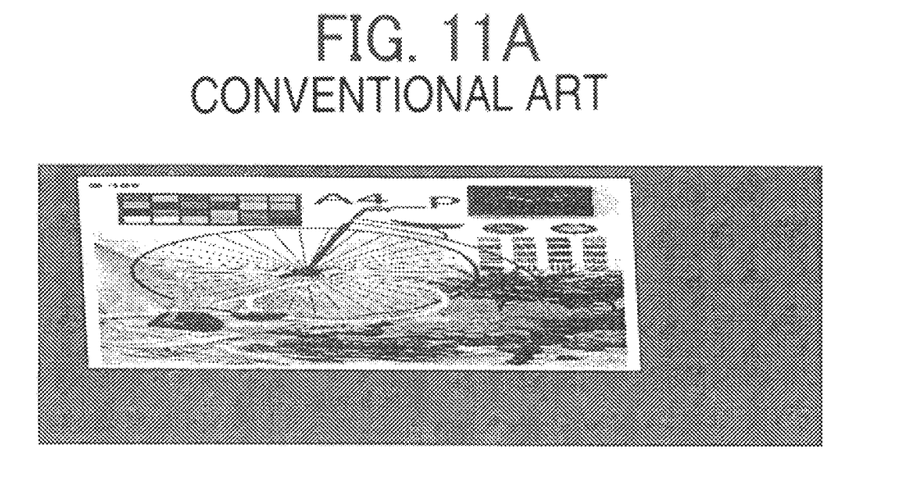
FIGS. 11A and 11B are views explaining image inputting of an image processing device of the conventional technology.
Figure 11B:
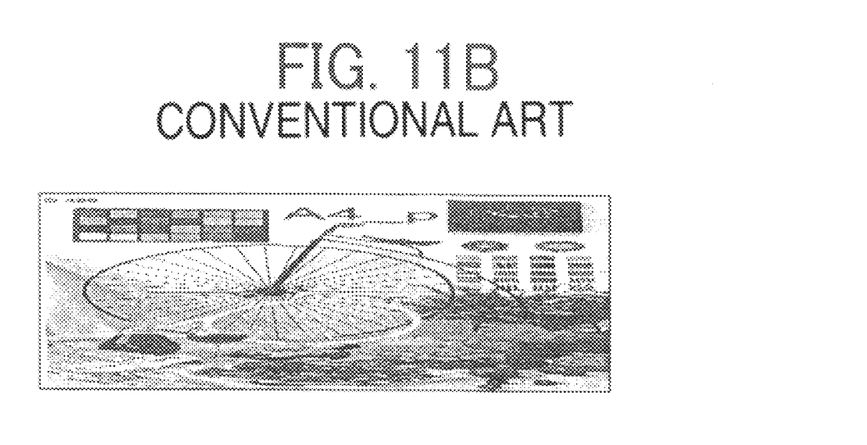

However, when an original document is inputted from image equipment such as a copier or scanner, for example, the color of pressure plates of image input equipment becomes black. When there is then a difference between the size of the original document and the size of a reading region, an image region occurs for black pixels corresponding to outside of the original document surrounding the inputted image (the same is also the case for images obtained via a network). The image region for the black pixels is information (noise information) that is not necessary for the user using the image equipment. When it is wished to know the actual original size, it is preferable for only images corresponding to original documents where unnecessary noise information has been cut-out automatically to be acquired. With recent image equipment, it is possible to specify resolution in the X-direction and Y-direction independently as conditions at the time of input. For example, it is possible to perform image inputting using conditions of 300 dpi in an X-axis direction and 75 dpi in a Y-axis direction (see FIG. 11A for an image before processing and FIG. 11B for an image after processing).

Regarding this situation, the conventional technology disclosed in the Japanese Patent Application Laid-open No. H8-320916 carries out processing on the assumption that, in order to detect tilting by using character regions and blank regions, a boundary formed by a character region and a blank region is a substantial straight line. Therefore, it is difficult to apply the conventional technology to an image when there is no blank region or when the character region is small in the image.

Moreover, tilting (tilting α) of an original document image in image data inputted based on the same resolution for the X-axis direction and Y-axis direction and tilting (tilting β) of an original document image within image data inputted based on different resolutions for the X-axis direction and Y-axis direction are different. This means that the tilting (tilting β) of the original document image in the image data inputted using different resolutions for the X-axis direction and Y-axis direction is different from the originally detected tilting (tilting α). Therefore, it is not possible to detect the tilting (tilting α) correctly using the invention disclosed in the Japanese Patent Application Laid-open No. H8-320916 when image data is inputted based on different resolutions for the X-axis direction and Y-axis direction.

Figure 13:
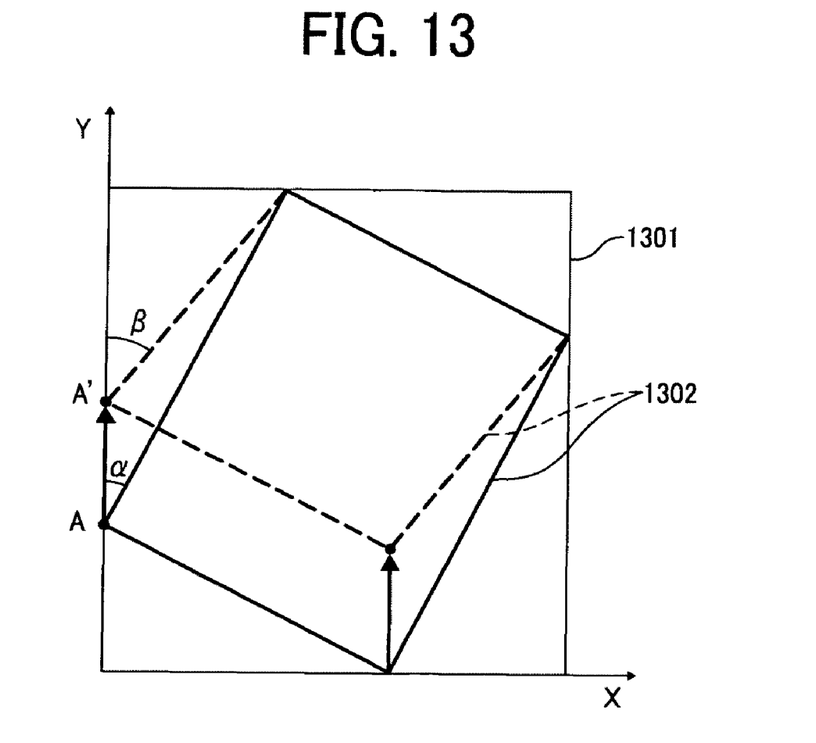
FIG. 13 is a view of an example where tilting angles of an original document image are different within an inputted image.

FIG. 13 is a view explaining the theory when tilting α and tilting β are different. When the Y-axis direction is read using a lower resolution than for the X-axis direction, the original document image (pixels) for the Y-axis direction of an original document image 1302 of an inputted image 1301 is thinned out. For example, a position "A" in the lower left-hand corner of the original document image 1302 is moved to a position "A'" in the lower left-hand corner of the inputted image 1301. Therefore, the tilting of the original document image 1302 within the inputted image 1301 inputted based on a different resolution for the X-axis direction and the Y-axis direction becomes the tilting β regardless of the actual tilting of an original document image 1302 being the tilting α.

SUMMARY OF THE INVENTION

It is an object of the present invention to at least partially solve the problems in the conventional technology.

According to an aspect of the present invention, there is provided an image processing device that includes an acquiring unit that acquires, from image data, processing image data having a first resolution in a first direction and a second resolution in a second direction different from the first direction; a receiving unit that receives input of a first theoretical resolution in the first direction and a second theoretical resolution in the second direction; and a tilt detecting unit that detects tilt of the image data in accordance with the processing image data and the first theoretical resolution and the second theoretical resolution.

According to another aspect of the present invention, there is provided an image processing method for detecting tilt of an original document image. The method includes acquiring, from image data, processing image data having a first resolution in a first direction and a second resolution in a second direction different from the first direction; receiving input of a first theoretical resolution in the first direction and a second theoretical resolution in the second direction; and detecting tilt of the image data in accordance with the processing image data and the first theoretical resolution and the second theoretical resolution.

According to still another aspect of the present invention, there is provided a computer-readable recording medium that stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
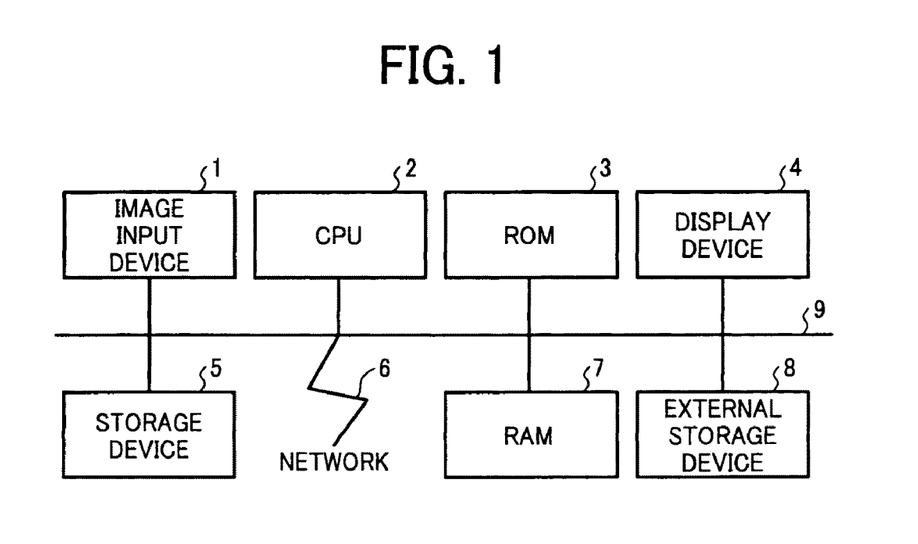
FIG. 1 is a block diagram of an outline structure for an image processor of a digital multifunction product according to an embodiment of the present invention.

FIG. 1 is a block diagram of an outline structure for an image processing unit of a digital multifunction product according to an embodiment of the present invention. The image processor includes an image input device 1, a central processing unit (CPU) 2, a read only memory (ROM) 3, a display device 4, a storage device 5, a random access memory (RAM) 7, and an external storage device 8, each being connected together via a bus 9. The digital multifunction product is connected to an external network 6.

The image input device 1 is a general purpose image reading device that is image equipment such as a scanner or input interface. The CPU 2 is a central arithmetic/processing unit that controls image extraction processing. The ROM 3 stores therein computer programs that start up the digital multifunction product and control image extraction processing. The RAM 7 is a work memory that temporarily stores therein images read out for image extraction processing. The storage device 5 is a large capacity memory, i.e., a hard disk drive (HDD), included within the copier that stores therein read-out images and images for which processing is complete. The external storage device 8 is an auxiliary storage device such as a flexible disc (FD), CD-ROM, MO (magneto-optical disc), or FD drive that is capable of reading computer programs etc. that control image extraction. The display device 4 is a display that displays image extraction processing instructions and image extraction conditions etc. The image processor exchanges image data with other personal computers and digital multifunction products via the external network 6 using a communication interface (not shown).

Outline of the operation of the digital multifunction product according to the embodiment is explained below.

When image regions other than the original document image (processed image data) are contained in the inputted image (image data) read by the image reading device such as a scanner, or when resolution is different in an X-axis direction and a Y-axis direction, the digital multifunction product of the embodiment extracts image regions for the original document image while removing image regions other than the original document image with a high degree of precision.

Figure 2:
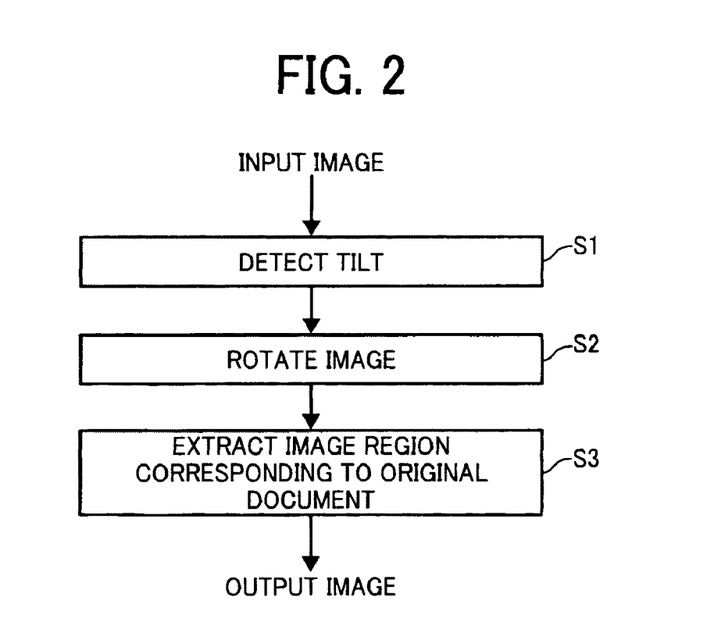
FIG. 2 is a flowchart of original document image extraction processing according to the embodiment.

FIG. 2 is a flowchart of processing that extracts original document images from the inputted images according to the embodiment. A simple explanation is given of a procedure for processing executed by the CPU 2 in accordance with a computer program that controls image extraction processing stored in the ROM 3 with reference to the flowchart. First, the CPU 2 detects tilting of an original document image occurring in an inputted image read by the image input device 1 (Step S1). When tilting occurs, the whole of the inputted image is rotated in a direction of no tilting (Step S2). An image region corresponding to the original document image is then extracted from the inputted image subjected to tilting correction (Step S3).

Figure 12:
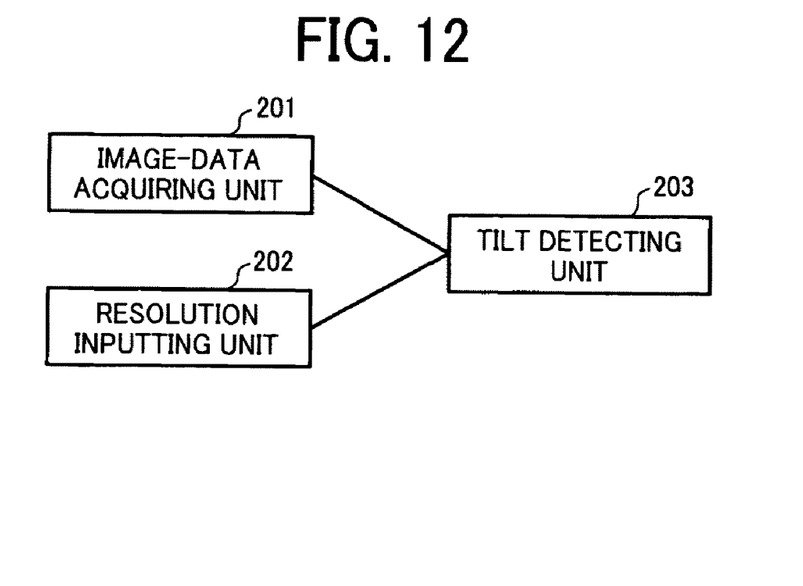
FIG. 12 is a functional block diagram of a digital multifunction product according to the embodiment.

The digital multifunction product according to the embodiment then implements the function shown in FIG. 12 as a result of the CPU 2 operating based on the computer program that controls the image extraction processing stored in the ROM while using the work region of the RAM 7. FIG. 12 is a functional block view of a digital multifunction product according to the embodiment.

Computer programs executed by the digital multifunction product can also be provided stored on a computer-readable storage medium such as a CD-ROM, FD, CD-R, or DVD (Digital Versatile Disk) etc. using an installable or executable file format. In this event, each function of the digital multifunction product is implemented by the CPU 2 reading the computer programs from the recording medium and loading the computer programs into a main storage device (not shown). It is also possible to store the computer programs in a computer connected to a network such as the Internet, and provide the computer program via the network in the form of a download. Further, the program can also be provided or distributed via a network such as the Internet.

The digital multifunction product of the embodiment includes an image-data acquiring unit 201, a resolution receiving unit 202 and a tilt detecting unit 203. The image-data acquiring unit 201 acquires original document images having differing resolutions in the X-axis direction and the Y-axis direction based on predetermined inputted images read in by the image input device 1. The resolution receiving unit 202 receives resolution in the X-axis direction and Y-axis direction or the original document image acquired by the image-data acquiring unit 201 via an operation unit (not shown). The tilt detecting unit 203 then detects tilting of the inputted image in accordance with the acquired original document image and the inputted resolution.

Figure 3A:
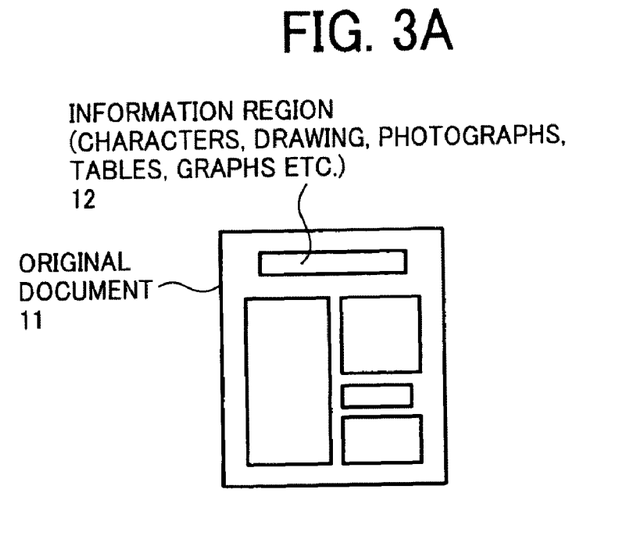
FIGS. 3A and 3B are views of the relationship of the image region within the inputted image according to the embodiment.
Figure 3B:
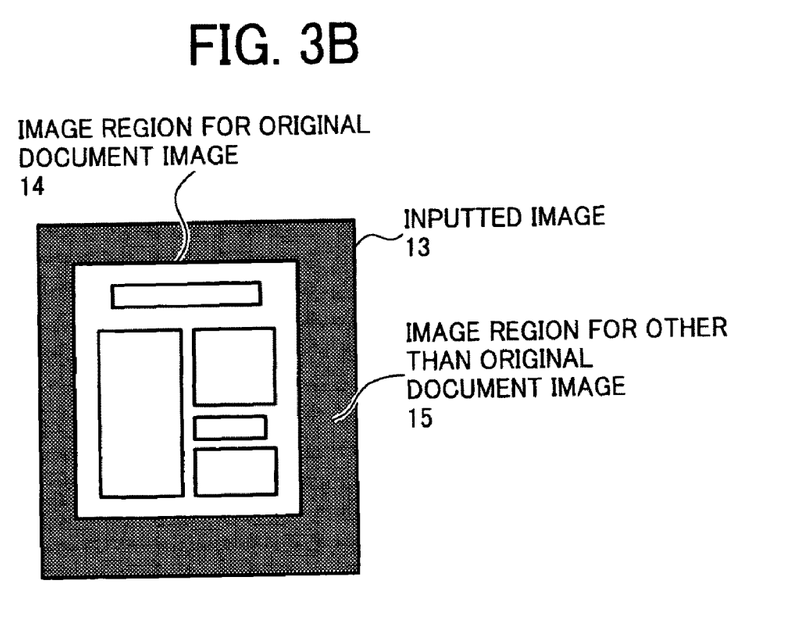

FIGS. 3A and 3B are views of the relationship of the image region of the original document image and image regions other than for the original document image. FIG. 3A is an example of an original document acquired by the image input device 1; numeral 11 denotes the original document, and numeral 12 denotes information regions for characters, drawings, photographs, tables, and graphs, etc. recorded on an original document 11. FIG. 3B is an example of an inputted image acquired by the image input device 1; numeral 13 is an inputted image read in by the image input device 1 and expanded at the RAM 7, numeral 14 is an image region of the original document image, and numeral 15 is an image region of other than the image region occurring at the periphery of the original document image as a result of the color etc. of a pressing plate (not shown) of the image input device 1. In this embodiment, an inputted image 13 is acquired as shown in FIG. 3B when the original document shown in FIG. 3A is read out by the image input device 1 without tilting. When the size of the read original document 11 is the same as the inputted image 13, the inputted image 13 that does not have a image region 15 other than the original document image is obtained.

Figure 4A:
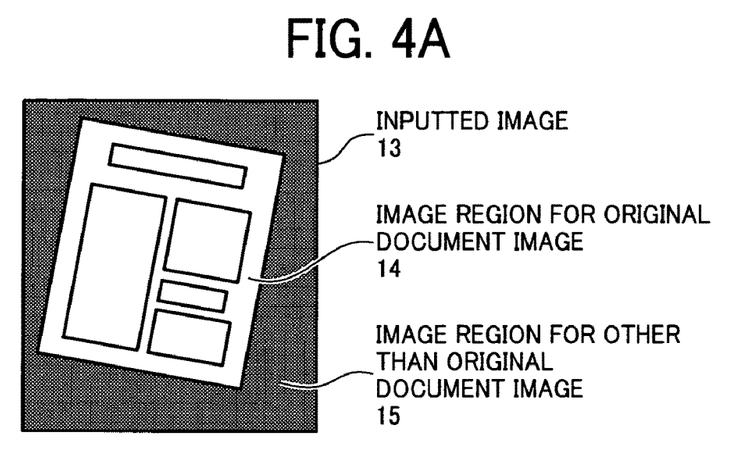
FIGS. 4A to 4C are views explaining the flow of original document image extraction processing according to the embodiment.
Figure 4B:
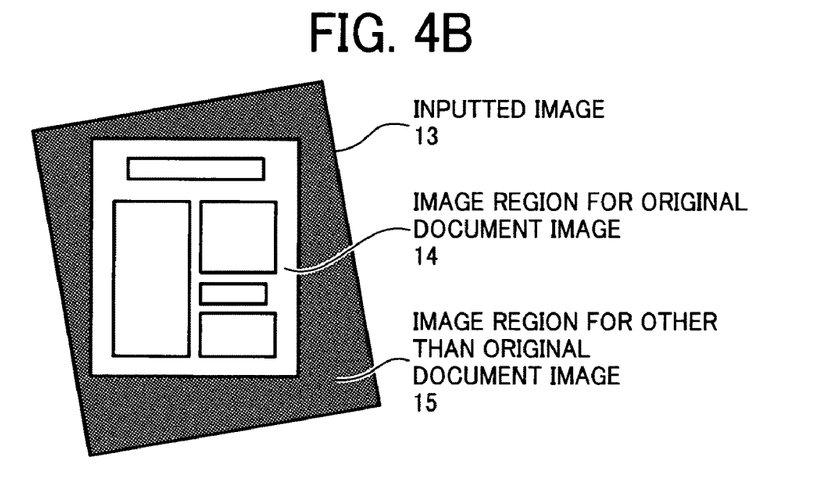
Figure 4C:
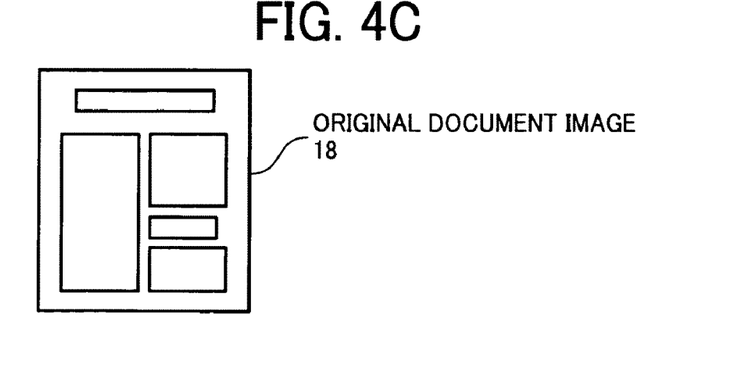

FIGS. 4A to 4C are views explaining the flow of processing that extracts an original document image according to the embodiment. FIG. 4A is an example of an inputted image when the original document image is tilted. FIG. 4B is an example of an inputted image where a tilted original document image is rotated and tilting is corrected. FIG. 4C is an example of an original document image extracted from an inputted image corrected for tilt of the original document image. The CPU 2 monitors the occurrence of the image regions 15 outside the original document on the RAM 7. When the image region 15 occurs, the CPU 2 detects tilt of the image region of the original document image (FIG. 4A). When tilt occurs, the CPU 2 rotates the inputted image 13 in the direction of no tilting (FIG. 4B). The CPU 2 then cuts out just an image region 14 of the original document image from the inputted image corrected for tilt, i.e. extracts an original document image 18 (FIG. 4C). The following is a detailed explanation for conversion processing of inputted images, compression processing of inputted images, original document image position information acquiring processing, original document image virtual position information calculating processing, tilt angle detection processing, boundary detection processing, and original document image extraction processing executed by the CPU 2 in accordance with the program that controls the image extraction processing stored in the ROM 3.

Conversion processing of the inputted image is explained below. In the embodiment, the original document is a gray scale or color image. When the inputted image from the image input device 1 includes an image region other than the original document image in an edge portion, the digital multifunction product removes the image region other than the original document image and extracts image regions of the original document image that are required by the user. With multivalued images such as when the original document image is a gray scale or color image, conversion from a multivalue image to a binary image is carried out by a general-purpose converter. A binary image is then generated temporarily. Necessary processing such as detection of tilt angle is then carried out on the binary image. Processing on a multivalue image is carried out by reflecting the processing results for the binary image in the inputted image each time.

For example, after a binary image is generated from the inputted image, detection of the tilt angle is carried out on the binary image. The inputted image (multivalue image) is then rotated by just the obtained tilt angle. It is also possible to generate a binary image again from a rotated image even if continued processing is carried out on a multivalue image, with extraction of image regions of the original document image then being carried out on the binary image. As described above, conversion takes place to a binary image and processing necessary in the extraction of image regions of the original document image is carried out even when the original document image is a multivalue image. It is therefore possible to carry out extraction processing at high-speed using less memory.

Compression processing of the inputted image is explained below. In the embodiment, when the size of the original document image inputted from the image input device 1 is large and an image region other than the original document region is included in the surrounding portion of the original document image, the digital multifunction product removes the image regions other than for the original document image, and extracts image regions of the original document image that are required by the user. Here, the CPU 2 monitors the size of the inputted image expanded in the RAM 7. When the size of the inputted image is determined to exceed a predetermined size, the size of the inputted image is reduced down to a predetermined size so as to create a compressed image for operation use. Each processing necessary in tilt angle detection etc. is then carried out on the compressed image. Extraction of an image region for the original document image is then carried out by reflecting the results of the processing in the inputted image each time.

For example, tilt angle detection is carried out for the compressed image after making the compressed image from the inputted image. The inputted image (image before compression) is then rotated by just the obtained angle. If processing is then carried out without generating a compressed image, it is also possible to generate a compressed image from the image for after rotation again and carry out extraction processing for the image region of the original document image for this compressed image. According to the embodiment, it is possible to extract image regions of original document images at high-speed using less memory even when the size of the inputted image is large. It is also possible to combine the conversion processing and the compression processing described above. It is further possible to make a binary image from a multivalue image and then make a compressed image from the binary image, and it is conversely possible to make a compressed image from a binary image and then generate a binary image from this compressed image.

Acquisition processing where the image-data acquiring unit 201 acquires position information for the original document image is explained below. In the embodiment, the digital multifunction product acquires position information for an original document image occurring at an inputted image where resolution in the X-axis direction and resolution in the Y-axis direction are different, with the inputted image including an image region of the original document image and image regions surrounding the image region of the original document image. An inputted image subjected to conversion processing and compression processing is acquired when the conversion processing and the compression processing described above is implemented. This position information is coordinate information specifying the position of the original document image and includes coordinate information for characters within the original document image (character string information), coordinate information for ruled lines (ruled line information), and position information (boundary information) for a boundary of an image region of the original document image within the inputted image and an image region outside of the original document image. The CPU 2, for example, acquires position information for an original document image taking the upper left corner of the inputted image expanded in the RAM 7 as original document image position information.

Next, conversion processing (arithmetic processing) for when the tilt detecting unit 203 converts position information for an original document image from resolution received by the resolution receiving unit 202 into virtual position information and detection processing that detects the tilt angle of the inputted image are carried out. When image regions other than the original document image are contained in the inputted image read by the image reading device such as a scanner, and when resolution is different in an X-axis direction and a Y-axis direction, the digital multifunction product extracts image regions for the original document image while removing image regions other than the original document image with a high degree of precision. Specifically, the tilt angle detection processing detects the boundary of the image region other than the original document image and the image region of the original document image. The ratio of the resolution of the X-axis direction and the Y-axis direction at the detected boundary is then enjoined and the tilt angle of the original document image is obtained.

Figure 5:
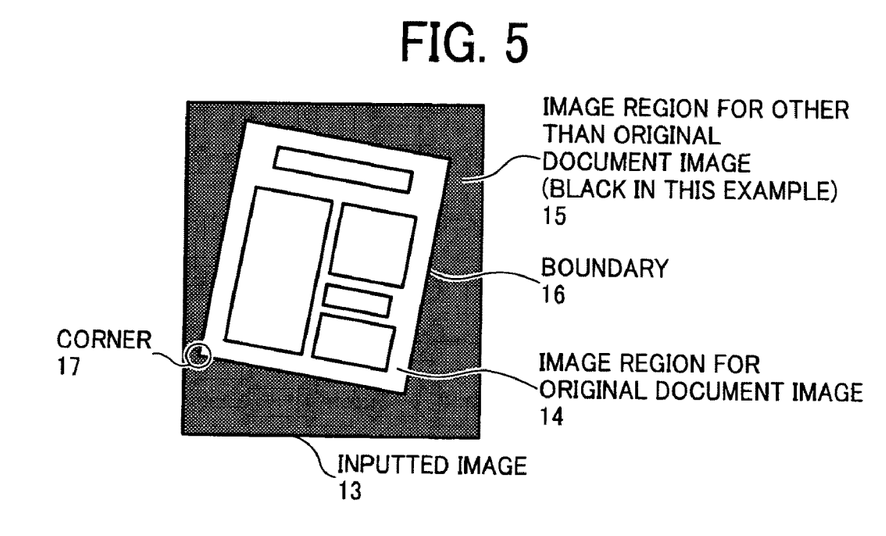
FIG. 5 is a view of an image region for an original document image and position information for the original document image for an inputted image according to the embodiment.

FIG. 5 is a view of an image region for an original document image and position information for the original document image for the inputted image according to the embodiment; numeral 13 schematically depicts the inputted image expanded in the RAM 7 read by the image input device 1, numeral 14 depicts the image region of the original document image, numeral 15 depicts the image region for other than the original document image, numeral 16 depicts the boundary of the image region of the original document image and the image region for other than the original document image, and numeral 17 depicts a corner indicating each position of the four corners occurring at the image region of the original document image. In the event that a corner 17 is included in a boundary 16, "boundary information" means position information for the boundary 16 encompassing the position information of the corner 17.

When the inputted image 13 is expanded on the RAM 7, the CPU 2 acquires position information (coordinate information) for the boundary 16 and position information (coordinate information) for the corner 17. As shown in the following equation, the acquired position information is multiplied by a resolution ratio. Position information for when the resolution in the X-axis direction and the Y-axis direction is the same is then obtained virtually and a tilt angle with respect to the inputted image 13 of the original document image is obtained based on this virtual position information.

Resolution ratio=resolution in X-axis direction/resolution in Y-axis direction

Virtual position information=position information for original document image×resolution ratio An explanation is given of arithmetic processing performed by the tilt detecting unit 203 that calculates virtual position information for the original document image by using character string information for characters within the original document image or ruled line information for ruled lines. When image regions other than the original document image are contained in the inputted image read by the image reading device such as a scanner, and when resolution is different in an X-axis direction and a Y-axis direction, the digital multifunction product extracts image regions for the original document image while removing image regions other than the original document image with a high degree of precision. Specifically, the processing that detects the tilt angle obtains the tilt angle of the original document image based on the tilt of the characters occurring in the original document image or the tilt of the ruled lines. Virtual position information can also be obtained in this case also in the same way as for calculating virtual position information using the boundary information, by carrying out the same operations (multiplication of resolution ratio) on position information for typical points for characters and ruled lines. A point of difference with the calculation processing for the virtual position information using the boundary information is the difference that the characteristic amount while obtaining the tilt angle is the boundary information or the character string information/ruled line information for in the original document image.

"Original document tilt detection method and device" disclosed in Japanese patent No. 3281469 and "Image tilt detection device" of Japanese patent No. 3338537 exist as technology for obtaining tilt from character string information and ruled line information. The former obtains tilt using a histogram for tilt made from character string rectangles. The latter takes coordinates of black and white boundary points occurring at upper ends of characters within the read image as a sequence of points, obtains a regression line from the coordinates, and calculates tilt from this regression coefficient.

An explanation is given of detection processing where the tilt detecting unit 203 detects tilt angle using the boundary information, character string information, ruled line information, and virtual position information. When image regions other than the original document image are contained in the inputted image read by the image reading device such as a scanner, and when resolution is different in an X-axis direction and a Y-axis direction, the digital multifunction product extracts image regions for the original document image while removing image regions other than the original document image with a high degree of precision. Specifically, the tilt angle detection processing obtains a tilt angle for the whole of the original document image based on tilt calculated from the boundary information and tilt calculated from the character string information and ruled line information for within the original document image.

Figure 6:
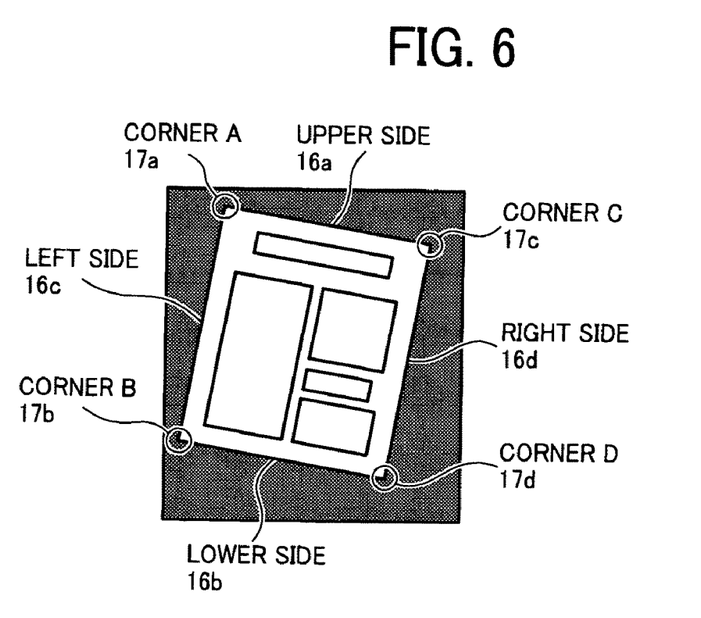
FIG. 6 is a view of position information for an original document image in an inputted image according to the embodiment.

It can be considered that the tilt detecting unit 203 decides tilt angle for the original document image by adopting an average value for the tilt angle, an intermediate value, and a most appropriate value calculated for the boundary information, the character information and the ruled line information, respectively. As shown in FIG. 6, each edge of the original document image (the upper side 16*a*, lower side 16*b*, left side 16*c*, and right side 16*d*) that are the sides linking each of the four corners of the original document image (the side linking corner A 17*a* to corner B 17*b*, the side linking corner C 17*c* to corner D 17*d*, the side linking corner A 17*a* to corner C 17*c*, and the side linking corner B 17*b* to corner D 17*d*) are split up into a pair of upper and lower sides and a pair of left and right sides. The upper and lower pair includes the upper side 16*a* and the lower side 16*b*, while the left and right pair includes the left side 16*c* and the right side 16*d*. Items where the difference is small for the respectively obtained tilt angles are then decided upon as the tilt angle for the original document image. FIG. 6 is a view of position information for an original document image in an inputted image according to the embodiment. An overall original document tilt angle is calculated using an average value and an intermediate value etc. for a number of items of position information. It is therefore possible to obtain a more accurate tilt angle; and therefore, more accurate extraction of the original document image is possible.

Setting processing for setting the range for detecting the boundary while detecting the boundary of the image region of the original document and image regions other than for the original document is explained below. In the embodiment, the digital multifunction product sets the search range for processing that obtains the boundary of the image region for the original document image and the image regions other than for the original document image in advance.

Figure 7:
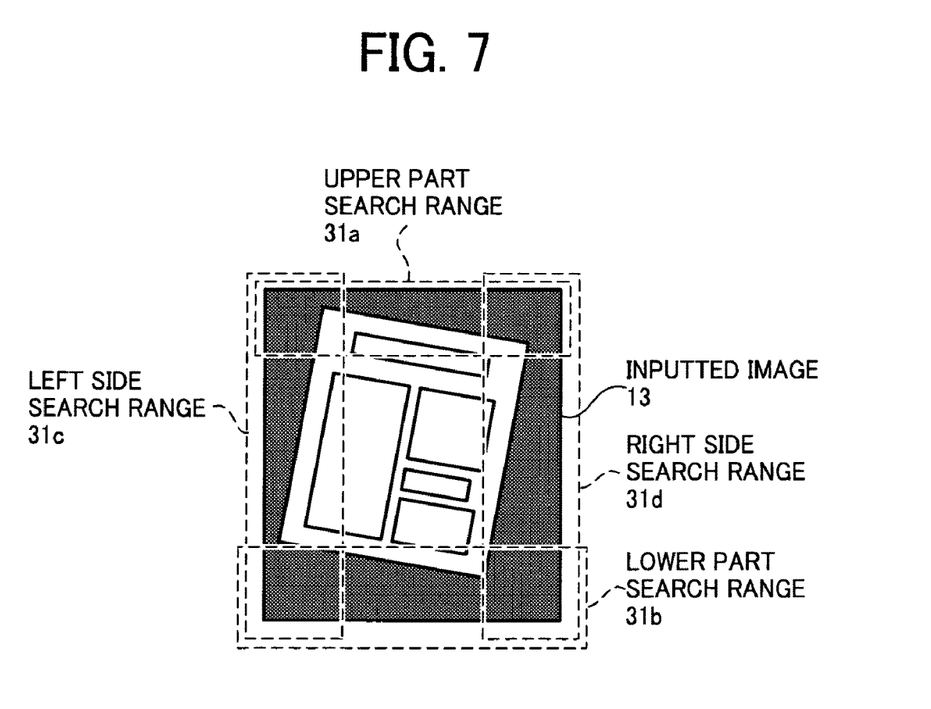
FIG. 7 is a view of a search outline set in advance in boundary detection according to the embodiment.

FIG. 7 is a view of a search outline set in advance in boundary detection according to the embodiment. In FIG. 7, of the inputted image 13, a rectangular range (upper part search range 31a) of a predetermined width at an upper end of the inputted image, a rectangular range (lower part search range 31b) of a predetermined width at a lower end of the inputted image, a rectangular range (left side search range 31c) of a predetermined width at a left end of the inputted image, and a rectangular range (right side search range 31d) of a predetermined width at a right end of the inputted image are taken as respective search ranges for the boundary search processing. The search ranges can be set using fixed values corresponding to the original document size. Alternatively, values (for example, calculated according to width, height, etc.) decided dynamically in accordance with the size of the original document can be used. The boundary is then detected within the set search range, rather than searching for the boundary over the whole of the inputted image, while obtaining the boundary of the image region of the original document image and the image region for other than the original document image.

According to the embodiment, the processing for boundary detection only has to be carried out within a restricted search range. High-speed detection of boundaries is therefore possible without having to carry out unnecessary search operations.

A detailed explanation is given of detection processing for the image-data acquiring unit 201 to detect the boundary between the image region of the original document image and the image regions for other than the original document image. In the embodiment, the digital multifunction product detects color end point position information (boundary information) continuing on from the upper and lower ends or the left and right ends of the image. The digital multifunction product then calculates tilt angle using the end point position information that reflects the resolution ratio of the X-axis direction and the Y-axis direction.

Figure 8A:
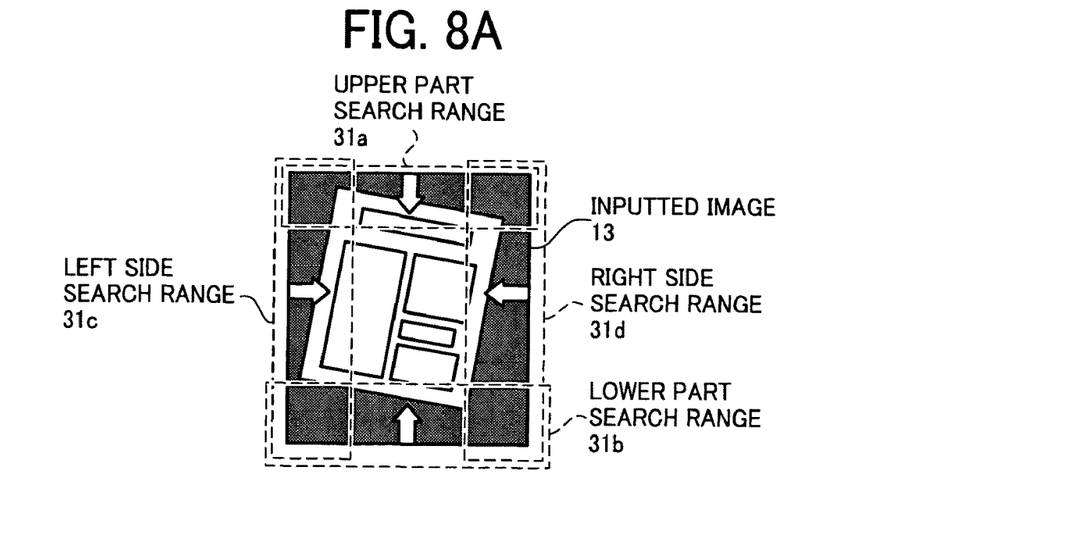
FIGS. 8A to 8C are views of an inputted image explaining the form of boundary detection according to the embodiment.

FIGS. 8A to 8C are views of an inputted image explaining the form of boundary detection according to the embodiment. As shown in FIG. 8A, the boundary search ranges (upper part search range 31a, lower part search range 31b, left side search range 31c, and right side search range 31d) are set. For example, with a binary image, the image region other than the original document image is black. A region of consecutive black pixels from the upper and lower and left and right edges is therefore obtained (bold arrows of FIG. 8A).

Figure 8B:
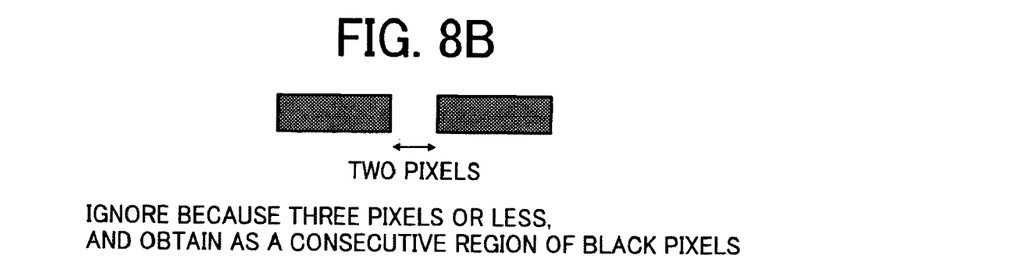
Figure 8C:
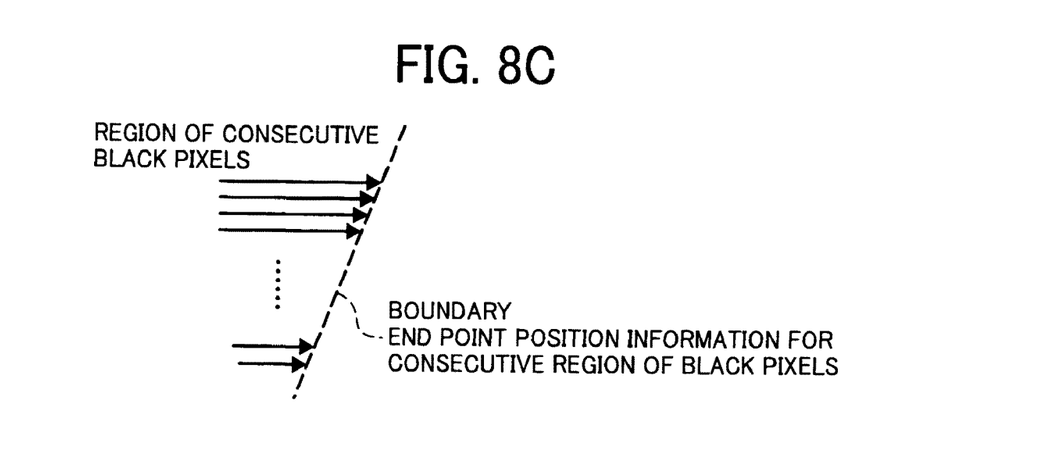

For example, a case of obtaining a region of consecutive black pixels within the left side search range 31c is described. A region of consecutive black pixels from the left side of the inputted image in the right direction of the drawing is obtained. A point where the consecutive pixels are cut off is then taken as an end point and end point position information is acquired. The boundary search is then carried out by scanning a predetermined interval in a direction towards the lower side from the upper side so as to give consecutively acquired end point position information (FIG. 8C). In the same manner as the above, regions of consecutive black pixels are obtained from the lower edge to the upper edge, from the left edge to the right edge, and from the right edge to the left edge, and end point position information is acquired. At this time, it is also conceivable that white pixels will be generated as noise at the image regions other than the original document image region. If the number of white pixels is then a predetermined value, for example, three, or less, is the white pixels are ignored and then handled in the same way as for a consecutive region of black pixels (FIG. 8B).

As shown in the following equation, the acquired end point position information is multiplied by the resolution ratio. Position information for the end point position for when the resolution in the X-axis direction and the Y-axis direction is the same is then obtained virtually and a tilt angle of the original document image is obtained from this virtual position information.

Resolution ratio=resolution in X-axis direction/resolution in Y-axis direction

Virtual position information=end point position information acquired from inputted image×resolution ratio According to the embodiment, it is possible to detect boundaries in a straightforward and precise manner.

A detailed explanation is given of further detection processing for the image-data acquiring unit 201 to detect the boundary between the image region of the original document image and the image regions for other than the original document image. In the embodiment, the digital multifunction product detects the end point position information for colors consecutive from the upper and lower ends or left and right ends of the image. Boundary information is then acquired from corner position information for the original document image obtained from changes in the end point position information. The tilt angle is then calculated using the boundary information reflecting the resolution ratio of the X-axis direction and the Y-axis direction.

Figure 9:
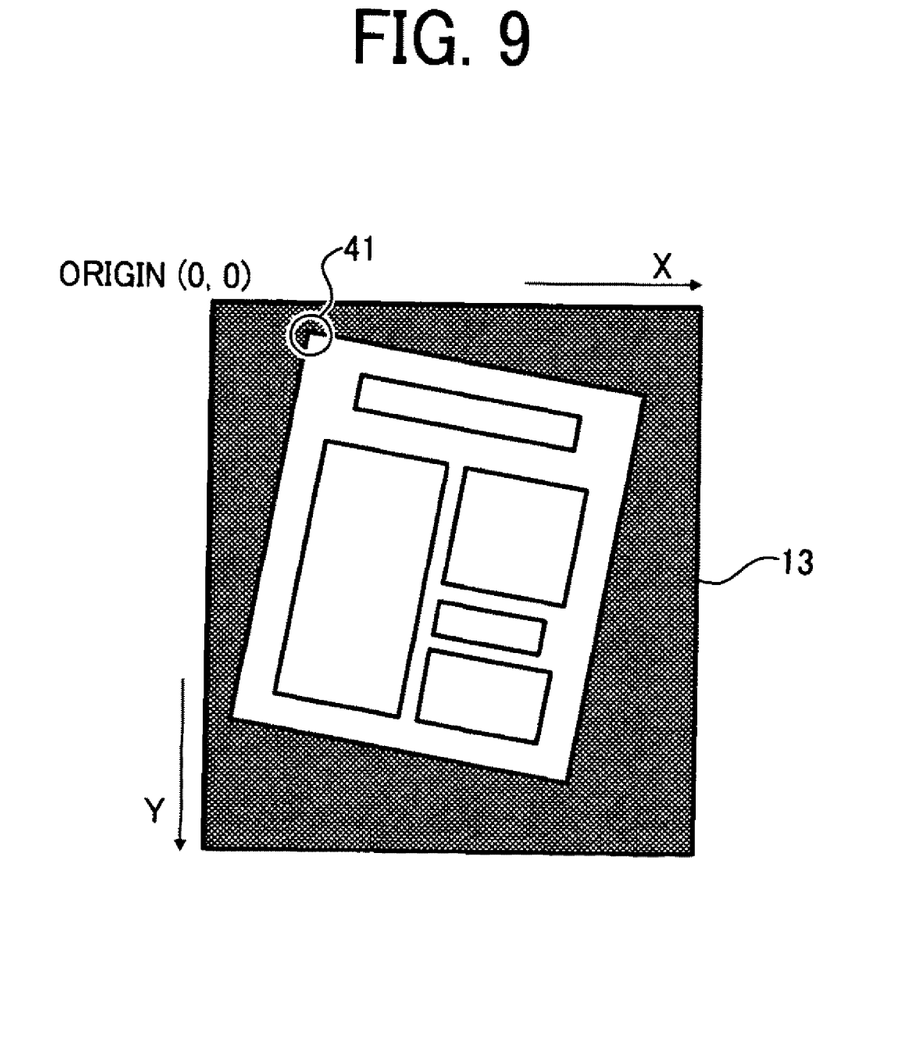
FIG. 9 is a view explaining a way of acquiring boundary information from end point position information in the embodiment.

FIG. 9 is a view explaining a way of acquiring boundary information from end point position information in the embodiment. Corner position information for each of the four corners is obtained from positions where the end point position information changes substantially. For example, position information for the left upper corner is a part where increase and decrease of the coordinates for the X-axis direction and Y-axis direction change. When the image region of the original document image is tilted down and to the right, when end point position information is scanned from the lower side in the direction of the right side, the coordinate values for the Y-axis direction are thinned out, and change so as to suddenly start to increase at point 41 corresponding to the upper left corner. The CPU 2 then takes this changing position as an upper left corner and this position information (corner position information) is acquired. Other corner position information can then also be acquired in the same manner. Boundary information is then acquired from edges connecting these items of corner position information.

When the image region of the original document image is tilted down and to the left, when end point position information is scanned from the left side in the direction of the upper side, the coordinates for the X-axis direction are thinned out, and change so as to suddenly start to increase from point 41 corresponding to the upper left corner. The CPU 2 then takes this changing position as an upper left corner and this position information (corner position information) is acquired. Other corner position information is then acquired in the same way so as to obtain the four corners. The tilt angle of the original document image is then calculated from straight lines (boundary information) linking the points for the four corners and can be obtained so as to reflect the resolution ratio in this case. For example, the tilt angle can be obtained from the following equation when obtaining it from the upper left and upper right corners;

Angle (Radians)=tan-1 (((upper left Y-axis coordinate−upper right Y-axis coordinate)×resolution ratio)/(upper right X-axis coordinate−upper left X-axis coordinate)

Falling of the image region of the original document image down and to the right or down and to the left can be detected in advance by taking change in coordinates as, for example, +1 in the case of increasing and −1 in the case of decreasing (it can be said that there is not substantial tilting if the value is close to zero) compared to the previous X-axis coordinates and Y-axis coordinates. It is also possible to detect change in both cases taking into consideration both the X-axis coordinates and the Y-axis coordinates. According to the embodiment, a boundary can be detected in a straightforward manner.

A detailed explanation is given of further detection processing for the image-data acquiring unit 201 to detect the boundary between the image region of the original document image and the image regions for other than the original document image. When the corners of the original document are folded, damaged or missing as a result of stapling etc., the digital multifunction product detects end point position information excluding the end point position information for the vicinity of the corners. Tilt angle calculations are then carried out using end point position information reflecting the resolution ratio of the X-axis direction and the Y-axis direction.

Figure 10A:
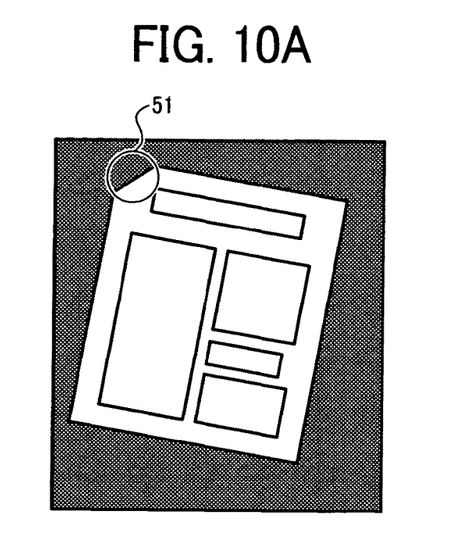
FIGS. 10A and 10B are views explaining carrying out of detection of end point position information with the exclusion of end point position information in the vicinity of the corners in the embodiment.
Figure 10B:
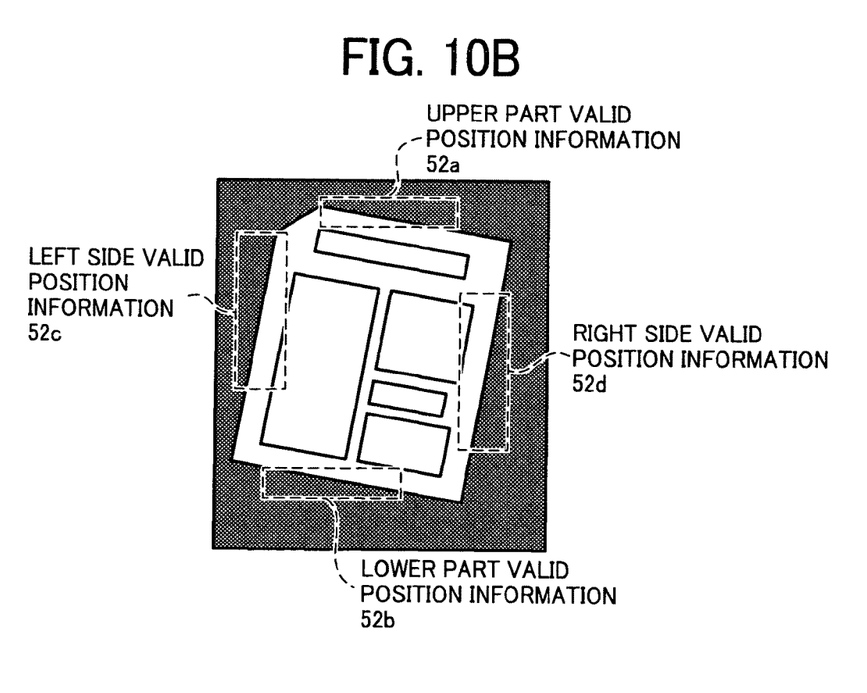

FIGS. 10A and 10B are views explaining carrying out of detection of end point position information with the exclusion of end point position information in the vicinity of the corners in the embodiment. In FIG. 10B, numeral 52a denotes upper part valid position information, numeral 52b denotes lower part valid position information, numeral 52c denotes left side valid position information, and numeral 52d denotes right side valid position information. The four items of valid position information are obtained from the following. As shown in FIG. 10A, an upper left corner 51 of the image region for the original document is missing. The position information for the missing upper left corner is therefore roughly obtained by obtaining the point of intersection of the left side and the upper side. End point position information for a range from both corners linking each corner excluding approximately ¼, respectively, is then obtained as valid position information. The valid position information (boundary information) is then used in processing for calculating tilt angle.

According to the embodiment, it is possible to detect the boundary of an image region of an original document image with a corner missing; and therefore, detection precision can be raised.

An explanation is given of processing for extracting original document images from inputted images corrected for tilting of the original document image based on the detected tilt angle. The digital multifunction product rotates the inputted image by just a tilt angle detected in a direction that corrects tilt of the original document image. An image region corresponding to the original document image is then cut-out (extracted) from the image region of the original document image the boundary is decided for at the rotated inputted image.

The image cutting is such that circumscribed rectangles are extracted taking note of background colors, with fellow extracted circumscribed rectangles then being united. The background colors in this case are background colors of the image region of the original document image. For example, with a binary image, circumscribed rectangles are obtained taking note of white pixels because the background color is white. The rectangles are then united so as to include the obtained circumscribed rectangles, and the largest rectangle finally united is then decided upon as an image region for the original document image. This image region is then extracted. A noise region is also assumed at this time. It is therefore also possible to carry out processing such as taking rectangles of less than a predetermined size to be noise and not uniting such rectangles.

According to the embodiment, it is possible to decide an image region to be an extraction target in a straightforward manner.

The above embodiment is an exemplary embodiment of the present invention that in no way limits the range of the present invention, and various modifications are possible without deviating from the scope of the essential spirit of the present invention.

It is also possible to achieve the object of the present invention by supplying a computer-readable medium (storage medium) recorded with software program code that implements the functions of the embodiment to an image processing device or an image forming device mounted with such an image processing device. A computer (CPU or MPU) of the image processing device or the image forming device then reads out and executes the program code stored in the storage medium.

In this case, the program code read out from the storage medium implements the functions of the embodiment and the computer-readable storage medium that stores therein this program code is applicable in the present invention.

It is also possible to use, for example, a floppy (registered trademark) disc, a hard disc, an optical disc, a magneto-optical disc, a CD-ROM, a CD-R, a CD-RW, a non-volatile memory card, or a magnetic tape etc. as the storage medium that supplies the program code.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
A processor configured to function as an acquiring unit that acquires, from image data, processing image data having a first resolution in a first direction and a second resolution in a second direction different from the first direction;

a receiving unit that receives input of a first theoretical resolution in the first direction and a second theoretical resolution in the second direction;

a tilt detecting unit that detects tilt of the image data in accordance with the processing image data and the first theoretical resolution and the second theoretical resolution; and wherein the tilt detecting unit converts a plurality of position information of the processing image data based on ratios of the first resolution and the first theoretical resolution and the second resolution and the second theoretical resolution, calculates a tilt angle of the image data from the converted position information and detects an average value, an intermediate value, and a most appropriate value for the image data from the converted position information.

2. The image processing device according to claim 1,
wherein the image data includes an original document image region, which corresponds to the processing image data, and other region,
wherein the tilt detecting unit converts the position information of the original document image region, and calculates a tilt angle of the original document image region from the converted position information of the original document image region.

3. The image processing device according to claim 2, wherein the position information of the original document image region is position information of a boundary of the original document image region and the other region.

4. The image processing device according to claim 2, wherein the position information of the original document image region is position information of position of any one or both of character strings and ruled lines within the original document image region.

5. An image processing method comprising:
acquiring, using a processor, from image data, processing image data having a first resolution in a first direction and a second resolution in a second direction different from the first direction;
receiving, using the processor, input of a first theoretical resolution in the first direction and a second theoretical resolution in the second direction; and
detecting, using the processor, tilt of the image data in accordance with the processing image data and the first theoretical resolution and the second theoretical resolution; and
wherein the detecting includes converting a plurality of position information of the processing image data based on ratios of the first resolution and the first theoretical resolution and the second resolution and the second theoretical resolution, calculating a tilt angle of the image data from the converted position information and detecting an average value, an intermediate value, and a most appropriate value for the image data obtained from the converted position information.

6. The image processing method according to claim 5,
wherein the image data includes an original document image region, which corresponds to the processing image data, and other region,
wherein the detecting includes converting the position information of the original document image region, and calculating a tilt angle of the original document image region from the converted position information of the original document image region.

7. The image processing method according to claim 6, wherein the position information of the original document image region is position information of a boundary of the original document image region and the other region.

8. The image processing method according to claim 6, wherein the position information of the original document image region is position information of position of any one or both of character strings and ruled lines within the original document image region.

9. A computer program product comprising a non-transitory computer usable medium having computer readable program codes embodied in the medium that, when executed, causes a computer to execute:
acquiring, from image data, processing image data having a first resolution in a first direction and a second resolution in a second direction different from the first direction;
receiving input of a first theoretical resolution in the first direction and a second theoretical resolution in the second direction;
detecting tilt of the image data in accordance with the processing image data and the first theoretical resolution and the second theoretical resolution;
wherein the detecting includes converting a plurality of position information of the processing image data based on ratios of the first resolution and the first theoretical resolution and the second resolution and the second theoretical resolution, calculating a tilt angle of the image data from the converted position information and detecting an average value, an intermediate value, and a most appropriate value for the image data obtained from the converted position information.

10. The computer program product according to claim 9,
Wherein the image data includes an original document image region, which corresponds to the processing image data, and other region,
wherein the detecting includes converting the position information of the original document image region, and calculating a tilt angle of the original document image region from the converted position information of the original document image region.

11. The computer program product according to claim 10, wherein the position information of the original document image region is position information of a boundary of the original document image region and the other region.

12. The computer program product according to claim 10, wherein the position information of the original document image region is position information of position of any one or both of character strings and ruled lines within the original document image region.

* * * * *